(12) United States Patent
Bestetti

(10) Patent No.: US 11,035,816 B2
(45) Date of Patent: Jun. 15, 2021

(54) MINIATURIZED ELECTROCHEMICAL CELL

(71) Applicant: NANOMATERIALS. IT s.r.l., Milan (IT)

(72) Inventor: Massimiliano Bestetti, Milan (IT)

(73) Assignee: NANOMATERIALS. IT S.R.L., Milan (IT)

( * ) Notice: Subject to any disclaimer, the term of this patent is extended or adjusted under 35 U.S.C. 154(b) by 191 days.

(21) Appl. No.: 16/468,745

(22) PCT Filed: Dec. 12, 2017

(86) PCT No.: PCT/EP2017/082417
§ 371 (c)(1),
(2) Date: Jun. 12, 2019

(87) PCT Pub. No.: WO2018/108903
PCT Pub. Date: Jun. 21, 2018

(65) Prior Publication Data
US 2019/0331628 A1    Oct. 31, 2019

(30) Foreign Application Priority Data
Dec. 14, 2016    (IT) .................. 102016000126012

(51) Int. Cl.
*G01N 27/28* (2006.01)
*G01N 17/02* (2006.01)
*G01N 27/403* (2006.01)

(52) U.S. Cl.
CPC ............. *G01N 27/28* (2013.01); *G01N 17/02* (2013.01); *G01N 27/403* (2013.01)

(58) Field of Classification Search
CPC ....... G01N 27/403; G01N 27/28; G01N 17/02
See application file for complete search history.

(56) References Cited

U.S. PATENT DOCUMENTS

| 4,806,849 A | 2/1989 | Kihira et al. |
| 5,698,085 A | 12/1997 | Yu |

(Continued)

FOREIGN PATENT DOCUMENTS

| CN | 103398942 A | 11/2013 |
| EP | 2 068 139 A1 | 6/2009 |
| WO | 2015/037832 A1 | 3/2015 |

OTHER PUBLICATIONS

International Search Report, dated Feb. 9, 2018 (4 pages).

(Continued)

*Primary Examiner* — Dominic E Hawkins
(74) *Attorney, Agent, or Firm* — Jacobson Holman PLLC

(57) ABSTRACT

A miniaturized electrochemical cell (2) comprising a main body (20) comprising a tip (21) wherein inlet (41) and outlet (51) hollow conduits of millimeter-size diameter are hollowed out separated by a partition wall (200) integral with the main body (20) in which an electrolytic liquid solution (10) flows, in a space between the tip (21) and a surface (90) of a conductor material to be analyzed (9) is identified a millimeter-size chamber for redox reactions (6), the tip (21) of the main body (20) comprises a millimeter-size opening (210) of millimetric dimension in communication with said millimeter-size chamber for redox reactions (6).

13 Claims, 13 Drawing Sheets

(56) References Cited

U.S. PATENT DOCUMENTS

2005/0258036 A1* 11/2005 Harding ............. G01N 27/3272
204/403.01
2014/0038224 A1*  2/2014 Yu ...................... G01N 23/2204
435/29
2014/0057195 A1*  2/2014 Chang ................... H01M 8/188
429/508

OTHER PUBLICATIONS

M.M. Lohrengel et al., "A new microcell or microreactor for material surface investigations at large current densities", Electrochimica Acta 49, Apr. 24, 2004, pp. 2863-2870, cited in the Specification (8 pages).
N. Birbilis et al., "Limitations in microelectrochemical capillary cell testing and transformation of electrochemical transients for acquisition of microcell impedance data", Electrochimica Acta 50, Feb. 3, 2005, pp. 3536-3544, cited in the Specification (9 pages).
N. Ebejer et al., "Localized high resolution electrochemistry and multifunctional imaging: scanning electrochemical cell microscopy", Analytical Chemistry vol. 82, No. 22, Nov. 15, 2010, pp. 9141-9145, cited in the Specification (5 pages).
M. Büchler et al., "The ec-pen in quality control: Determining the corrosion resistance of stainless steel on-site", International Symposium (NDT-CE 2003) Non-Destructive Testing in Civil Engineering 2003, cited in the Specification (4 pages).
F. Schmidli et al., "Bestimmung der Korrosionsbeständigkeit von Dentallegierungen mit einer neuartigen Messmethode", Schweiz Monatsschr Zahnmed vol. 119, Jun. 2009, pp. 584-588, cited in the Specification (5 pages).

* cited by examiner

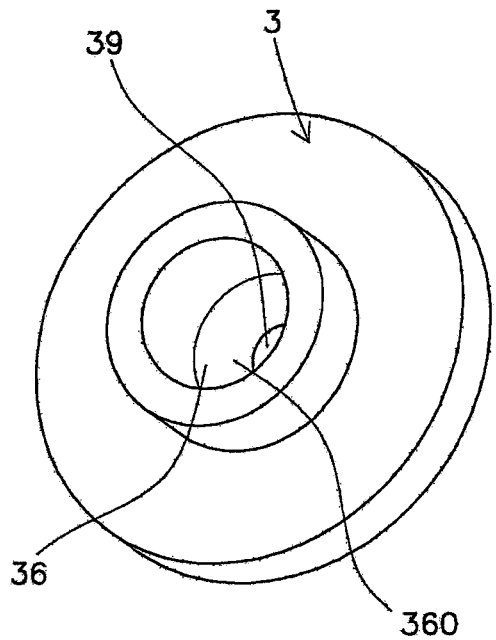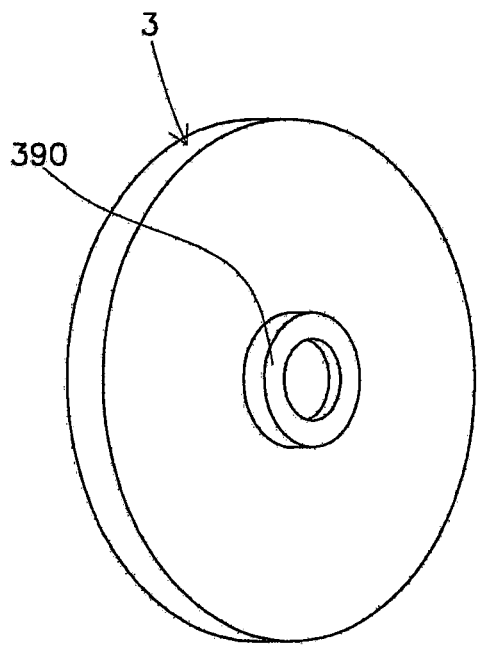
Fig. 7          Fig. 8
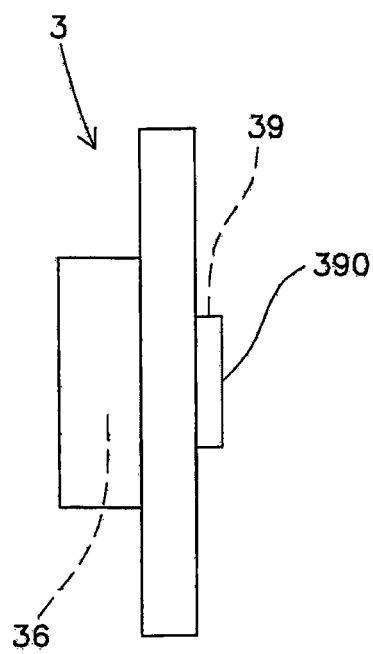
Fig. 9

MINIATURIZED ELECTROCHEMICAL CELL

BACKGROUND OF THE INVENTION

The present invention relates to a miniaturized electrochemical cell. In the prior art microcells for localized electrochemical measurements have been proposed in the literature for example in M. M. Lohrengel, C. Rosenkranz, I. Kliippel, A. Moehring, H. Bettermann, B. Van den Bossche, J. Deconinck, "A new microcell or microreactor for material surface investigations at large current densities", Electrochimica Acta 49 (2004) 2863-2870; N. Birbilis, B. N. Padgett, R. G. Buchheit, "Limitations in microelectrochemical capillary cell testing and transformation of electrochemical transients for acquisition of microcell impedance data", Electrochimica Acta 50 (2005) 3536-3544; N. Ebejer, M. Schnippering, A. W. Colburn, M. A. Edwards, P. R. Unwin, "Localized high resolution electrochemistry and multifunctional imaging: scanning electrochemical cell microscopy", Analytical Chemistry 82 (2010) 9141-9145) and describe capillary tube cells with glass or metal, beaded or silicone sealing ring, coaxial tube flow capillaries. The counter electrode is a wire inserted into the capillary tube, or it is the capillary itself or a coating within the capillary, as described for example in RU-2088913-C1, RU-2020461-C1, CN-103398942-B, CN-104655553-A. Disadvantageously, glass capillaries are capable of defining investigating surfaces in the order of a few square micrometers and are only adapted to study very small regions up to the single crystal grains of material or single particles. A drawback of such capillaries is that they do not allow liquid replacement near the area object of the analysis. Therefore, during a test concentration, polarizations may arise which distort the voltage measurement value. In order to overcome this drawback, theta capillaries have been proposed comprising a glass capillary tube divided in two parts by a glass partition wall. In this way a conduit may be used to carry the electrolytic solution from the outer tank to the surface to be analyzed and the second adjacent conduit is used to carry the solution from the surface back to the tank, thus ensuring constant replacement of the solution as described for example in N. Birbilis, B. N. Padgett, R. G. Buchheit, "Limitations in microelectrochemical capillary cell testing and transformation of electrochemical transients for acquisition of microcell impedance data", *Electrochimica Acta* 50 (2005) 3536-3544.). Disadvantageously, the glass conduit is difficult to be positioned, fragile and subject to breakages, does not allow to suitably size the electrolytic liquid solution flow conduits. The electrochemical measurements based on the capillaries and on the theta capillaries are to be interpreted with caution as there are significant ohmic effects due to the reduced dimensions of the investigated area, effects due to the quick potential scanning in the potentiodynamic measurements in order to avoid solution leakages or locking of the tip, effects of the dimension of the tip on the current limit value, and the difficulty of conducting electrochemical impedance spectroscopy measurements. Capillaries and theta capillaries allow to isolate surfaces with very small area in the order of tens of square micrometers. Disadvantageously, glass capillaries are fragile and often break. There are also examples of instrumentation designed to make electrochemical corrosion measurements on surfaces in the order of square millimeters, as described for example in M. Buehler, C. H. Voûte, D. Bindschedler, F. Stalder, "The ec-pen in quality control: Determining the corrosion resistance of stainless steel on-site" in: International Symposium (NDT-CE 2003) Non-Destructive Testing in Civil Engineering (2003). This type of instruments is based on the use of an electrolytic solution-soaked pad which is rested against the surface to be analyzed, as described for example in F. Schmidli, M. Jungo, K. Jäger, H. Lüthy, M. Buehler, "Bestimmung der Korrosionsbestandigkeit von Dentallegierungen mit einer neuartigen Messmethode", Schweiz Monatsschr Zahnmed Vol. 119 June 2009, 584-588. In this case, the analyzed surface has larger dimensions with respect to the capillary and the theta capillary cases, but disadvantageously this technical solution does not accurately define the area of analysis and does not allow the circulation of the electrolytic liquid solution which is stagnant and concentration polarizations arise which distort the voltage measurement value. Moreover, there are further technical drawbacks related to calibration problems due to the pressure of the pen pad against the material to be analyzed.

SUMMARY OF THE INVENTION

It is an object of the present invention to provide an electrochemical cell which allows to make electrochemical measurements on areas in the order of one square millimeter, for electrochemical corrosion tests, for thickness measurements according to the coulometry technique and for localized galvanic depositions, which is solid, simpler to use and easier to make, which reduces ohmic effects on the investigated area, which reduces effects due to the quick potential scanning in the potentiodynamic measurements, which avoids solution leakages, which avoids the locking of the tip, which avoids effects of the dimension of the tip on the current limit value, which avoids effects of concentration polarizations over the course of the measurements, which allows to conduct electrochemical impedance measurements in a very simplified way.

According to the invention, such an object is achieved with a miniaturized electrochemical cell comprising a main body comprising a tip adapted to allow electrochemical measurements of a surface of a conductor material to be analyzed which serves as working electrode, said main body comprising at least one inlet hollow conduit for an electrolytic liquid solution and at least one outlet hollow conduit for said electrolytic liquid solution, said electrolytic liquid solution flowing from said at least one inlet hollow conduit to said at least one outlet hollow conduit, the miniaturized electrochemical cell comprising a counter electrode, said miniaturized electrochemical cell mounting a reference electrode, at a region of the tip each of said at least one inlet hollow conduit narrows into at least one inlet hollow conduit of millimeter-size diameter and each of said at least one outlet hollow conduit narrows into at least one outlet hollow conduit of millimeter-size diameter, at a space between the tip and the surface of the conductor material to be analyzed a millimeter-size chamber for redox reactions is identified which communicates with said at least one inlet hollow conduit of millimeter-size diameter and with said at least one outlet hollow conduit of millimeter-size diameter, said at least one inlet hollow conduit of millimeter-size diameter is separated from said at least one outlet hollow conduit of millimeter-size diameter by at least one partition wall, characterized in that said at least one partition wall is one piece with said main body, said at least one inlet hollow conduit and said at least one outlet hollow conduit are hollowed out inside the main body, the tip of the main body comprises a millimeter-size opening of millimetric dimension which communicates with said millimeter-size chamber for redox reactions, wherein said millimeter-size opening is defined by said at least one partition wall, by said at least one inlet hollow conduit of millimeter-size diameter and by said at least one outlet hollow conduit of millimeter-size diameter.

A further object of the present invention is to provide a sealing ring which cooperates with the miniaturized electrochemical cell which allows to make electrochemical measurements on areas in the order of one square millimeter, for electrochemical corrosion tests, for thickness measurements according to coulometry techniques and for localized galvanic depositions, which is solid, simpler to use and easier to make, which reduces ohmic effects on the investigated area, which reduces effects due to the quick potential scanning in the potentiodynamic measurements, which avoids solution leakages, which avoids the locking of the tip, which avoids effects of the dimension of the tip on the current limit value, which avoids effects of concentration polarizations when voltage is measured, which allows to conduct electrochemical impedance spectroscopy measurements in a very simplified way, which does not have calibration problems depending on the cell pressure exerted against the material to be analyzed.

According to the invention, such further object is achieved by means of a combination of a sealing ring and a miniaturized electrochemical cell, said sealing ring being mounted on the tip of the main body of the miniaturized electrochemical cell, said sealing ring comprising a through opening which has a cross section of circular shape defining a circular border of the through opening which is in contact with the surface of the conductor material to be analyzed, said through opening being coaxial to the millimeter-size opening of the tip of the main body of the miniaturized electrochemical cell, said through opening comprising an inner cavity adapted to surround the millimeter-size chamber for redox reactions, characterized in that said circular border of the through opening has millimetric dimensions.

Still a further object of the present invention is to provide a device for localized electrochemical measurements which allows to make electrochemical measurements on areas in the order of one square millimeter, for electrochemical corrosion tests, for thickness measurements according to the coulometry technique and for localized galvanic depositions, which is solid, simpler to use and easier to make, which reduces ohmic effects on the investigated area, which reduces effects due to the quick potential scanning in the potentiodynamic measurements, which avoids solution leakages, which avoids the locking of the tip, which avoids effects of the dimension of the tip on the current limit value, which avoids effects of concentration polarizations when voltage is measured, which allows to conduct electrochemical impedance measurements in a very simplified way, which does not have calibration problems depending on the cell pressure exerted against the material to be analyzed.

According to the invention such further object is achieved with a device for localized electrochemical measurements, characterized in that it comprises a combination of a sealing ring and a miniaturized electrochemical cell.

DESCRIPTION OF THE DRAWINGS

These and other features of the present invention will appear more clearly from the following detailed description of a practical embodiment thereof, made by way of a non-limiting example with reference to the accompanying drawings, in which:

FIG. 7 shows a perspective view of the sealing ring from the side which is mounted on top of the tip of the miniaturized electrochemical cell;

FIG. 8 shows a perspective view of the sealing ring in FIG. 7 from the outer side which is rested on top of the conductor material to be analyzed;

FIG. 9 shows a side view of the sealing ring in FIG. 7;

DETAILED DESCRIPTION OF THE INVENTION

Figure 1:
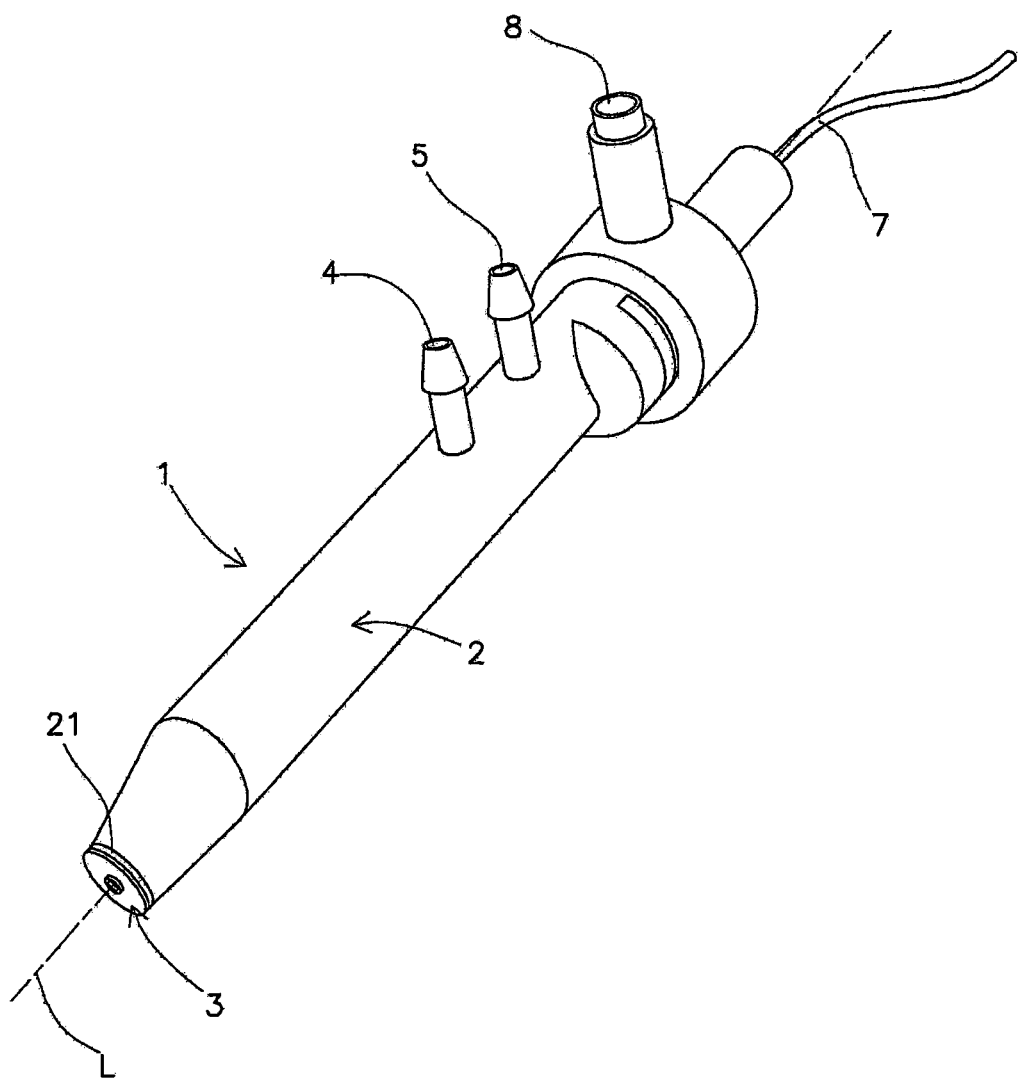
FIG. 1 shows a perspective view of the device for localized electrochemical measurements comprising a miniaturized electrochemical cell and a sealing ring according to the present invention.

With reference to the figures listed above, a device for localized electrochemical measurements 1 is shown which comprises a miniaturized electrochemical cell 2 and a sealing ring 3 mounted on top of a tip 21 of the miniaturized electrochemical cell 2, wherein said sealing ring 3 is adapted to be rested on top of a surface 90 of a conductor material 9 to be analyzed which serves as working electrode.

The miniaturized electrochemical cell 2 comprises a main body 20.

Said main body 20 has a cylindrical shape. The main body 20 extends in the direction of a longitudinal axis L.

Figure 2:
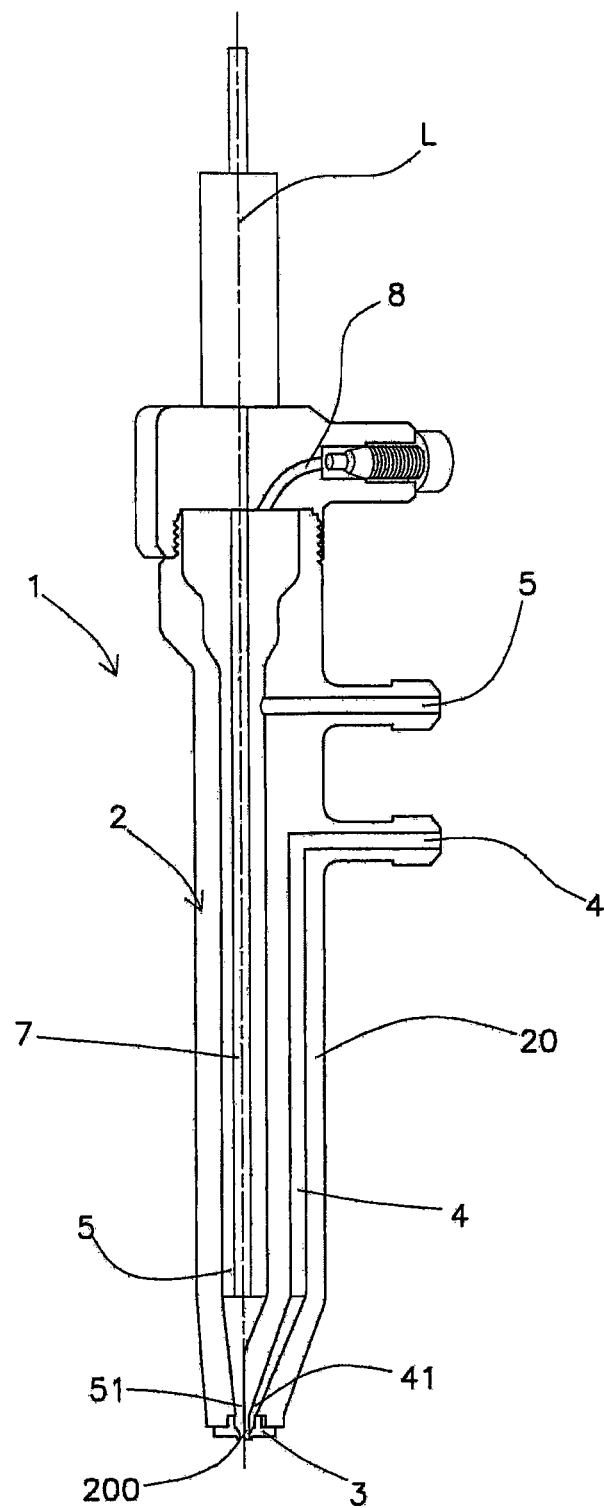
FIG. 2 shows a longitudinal section of the device for localized electrochemical measurements of FIG. 1.

As shown in FIG. 2, the main body 20 of the miniaturized electrochemical cell 2 comprises at least one inlet hollow conduit 4 for an electrolytic liquid solution 10 and at least one outlet hollow conduit 5 for said electrolytic liquid solution 10. The electrolytic liquid solution 10 flows inside the main body 20 of the miniaturized electrochemical cell 2 from the inlet hollow conduit 4 to the outlet hollow conduit 5.

The device for localized electrochemical measurements 1 also comprises a counter electrode 7 and a reference electrode 8.

The counter electrode 7 is immersed in a region of the outlet hollow conduit 5. The counter electrode 7 is made of platinum and is a wire or a toecap.

The reference electrode 8 of the device for localized electrochemical measurements 1 is miniaturized and for example is made of AgAgCl 3M KCl.

When the tip 21 of the main body 20 of the miniaturized electrochemical cell 2 is contacted with the surface 90 of the conductor material to be analyzed 9, a region of space is identified between the tip 21 of the main body 20 and the surface 90 of the conductor material 9 to be analyzed which is adapted to serve as millimeter-size chamber for redox reactions 6.

Said millimeter-size chamber for redox reactions 6 communicates with said inlet conduit 4 and with said outlet conduit 5 and is adapted to allow a flow of the electrolytic liquid solution 10 from the inlet canal 4 to the millimeter-size chamber for redox reactions 6 to the outlet conduit 5 so as to allow the replacement of the electrolytic liquid solution in a region of the outlet duct 5 wherein the counter electrode 7 is provided.

Said conductor material 9 to be analyzed serves as working electrode once in contact with the tip 21 of the miniaturized electrochemical cell 2.

Figure 4:
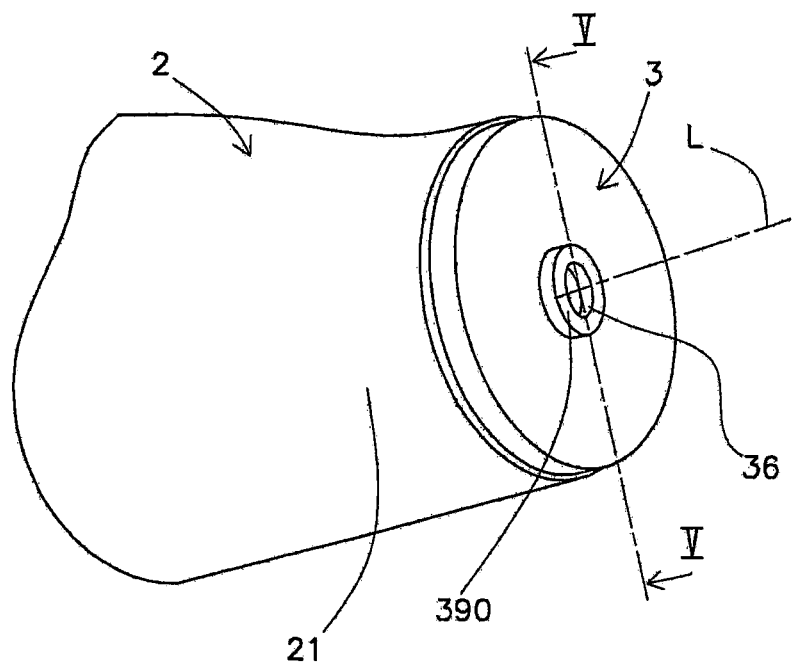
FIG. 4 shows the tip of the miniaturized electrochemical cell mounting a sealing ring adapted to be rested on top of a conductor material to be analyzed which serves as working electrode.

As shown in FIG. 4, alternatively it is provided that the millimeter-size chamber for redox reaction 6 is delimited by a circular sealing ring 3 comprising a through opening 360 of millimeter-size diameter, wherein said sealing ring 3 co-operates with said miniaturized electrochemical cell 2 to better contain the electrolytic liquid solution 10 and to better delimit the working area on the surface 90 of the conductor material to be analyzed 9. Said delimited working area of the sealing ring 3 is the millimeter-size chamber for redox reactions 6.

Said sealing ring 3 is mounted on top of the tip 21 of the main body 20 of the miniaturized electrochemical cell 2.

Advantageously, said sealing ring 3 mounted on the tip 21 of the miniaturized electrochemical cell 2 allows to increase the flow velocity of the electrolytic liquid solution 10 in the millimeter-size chamber for redox reactions 6.

Figure 5:
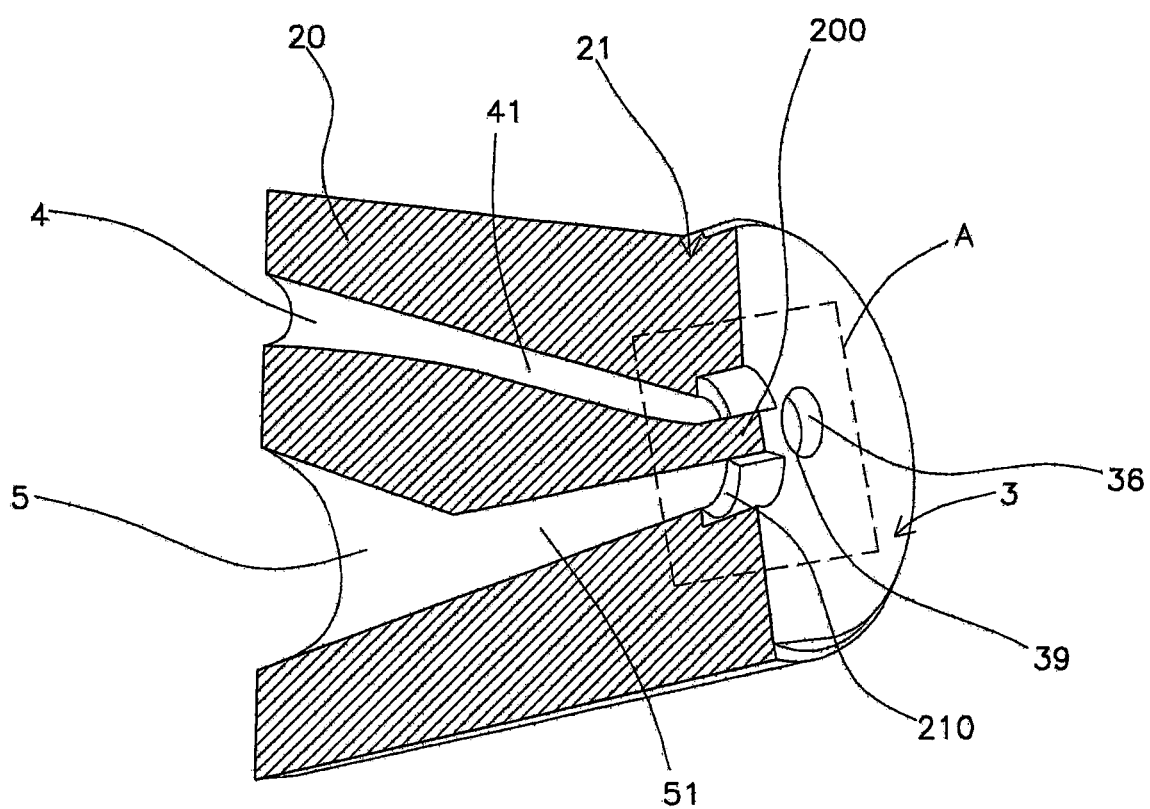
FIG. 5 shows a longitudinal section along the lines V-V in FIG. 4.

As shown in particular in FIGS. 2 and 5, in the region of the tip 21 of the main body 20 of the miniaturized electrochemical cell 2, the inlet hollow conduit 4 comprises an inlet hollow conduit of millimeter-size diameter 41, the outlet hollow conduit 5 comprises an outlet hollow conduit of millimeter-size diameter 51. By millimeter-size diameter it is meant a diameter comprised between 0.1 mm and 5 mm.

The electrolytic liquid solution 10 is caused to flow inside the main body 20 and in the millimeter-size chamber for redox reactions 6 by an outer pump, which may be for example a membrane pump or a peristaltic pump.

In the region of the tip 21 of the miniaturized electrochemical cell 2, the inlet hollow conduit of millimeter-size diameter 41 and the outlet hollow conduit of millimeter-size diameter 51 are divided by a partition wall 200.

In the region of the tip 21 the inlet hollow conduit 4 narrows into the inlet hollow conduit of millimeter-size diameter 41 and the outlet hollow conduit 5 narrows into said outlet hollow conduit of millimeter-size diameter 51.

In a space between the tip 21 and the surface 90 of the conductor material to be analyzed 9, a millimeter-size chamber for redox reactions 6 is identified which communicates with said inlet hollow conduit of millimeter-size diameter 41 and with said at least one outlet hollow conduit of millimeter-size diameter 51.

Figure 3:
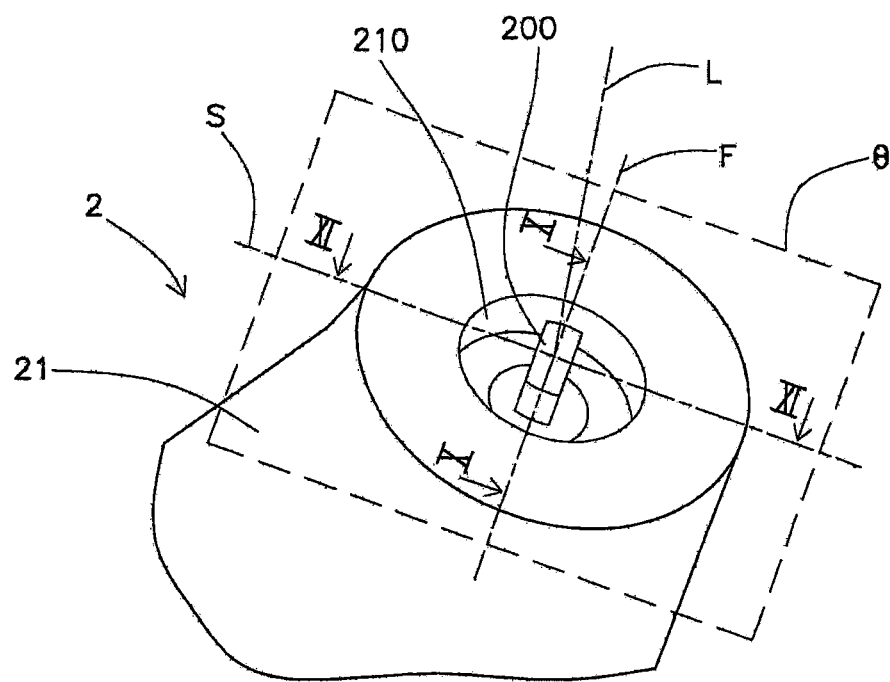
FIG. 3 shows an exposed portion of the tip of the miniaturized electrochemical cell which shows a partition wall.

As shown in particular in FIG. 3, said partition wall 200 of the tip 21 of the main body 20 of the miniaturized electrochemical cell 2 extends outwardly starting from the tip 21 of the main body 20, so that said partition wall 200 enters by a portion of space inside the millimeter-size chamber for redox reactions 6.

The inlet hollow conduit of millimeter-size diameter 41 is separated from said outlet hollow conduit of millimeter-size diameter 51 by at least said partition wall 200.

As shown in FIG. 3, said partition wall 200 has a solid geometric shape with a side of longer length aligned with a first radius F of a geometric cross section of the main body 20 and with a side of shorter length aligned with a second radius S of the geometric cross section of the main body 20, said first radius perpendicular to the second radius. Said cross section lies geometrically on a geometric plane $\Theta$ which is perpendicular to the longitudinal axis L.

Said portion of space of the millimeter-size chamber for redox reactions 6 is occupied by the partition wall 200 of the miniaturized electrochemical cell 2 so as to allow the electrolytic liquid solution 10 to pass from the inlet hollow conduit 4 to the outlet hollow conduit 5.

It is possible to provide, as shown in particular in FIGS. 7-11, for said sealing ring 3 to comprise a through opening 360 which has a cross section of circular shape defining a circular border 390 of the through opening 360 which is in contact with the surface 90 of the conductor material to be analyzed 9.

Said through opening 360 is coaxial with the millimeter-size opening 210 of the tip 21 of the main body 20 of the miniaturized electrochemical cell 2. Said through opening 360 comprises the inner cavity 36 adapted to surround the millimeter-size chamber for redox reactions 6.

Said circular border 390 of the through opening 360 has millimetric dimensions and has a diameter comprised between 0.2 and 6 mm.

Said inner cavity 36 is adapted to contain at least one portion of the partition wall 200 which extends from the tip 21 of the miniaturized electrochemical cell 2 outwards.

Said inner cavity 36 passes along the longitudinal axis L.

Figure 10:
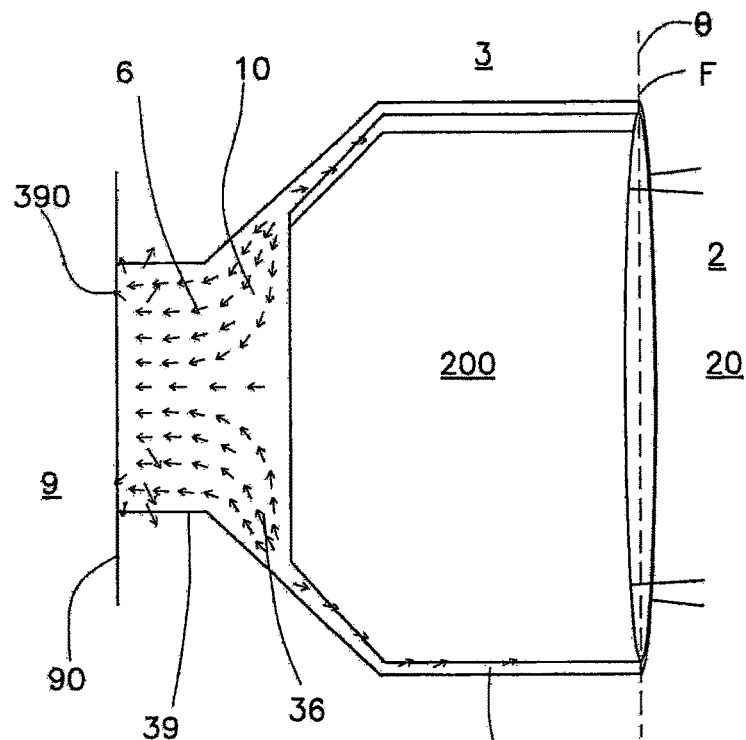
FIG. 10 shows a cutaway view along the radius X-X in FIG. 3 which shows in a complementary way a shape of the millimetric chamber for redox reactions with the presence of the partition wall along the larger dimension thereof.

As shown in FIG. 10, the side of longer length of the partition wall 200 has similar dimensions with respect to those of the inner cavity 36, in order to block or strongly restrict the flow of the electrolytic liquid solution 10 at the radial dimension of the inner cavity 36 along the first radius F.

Figure 11:
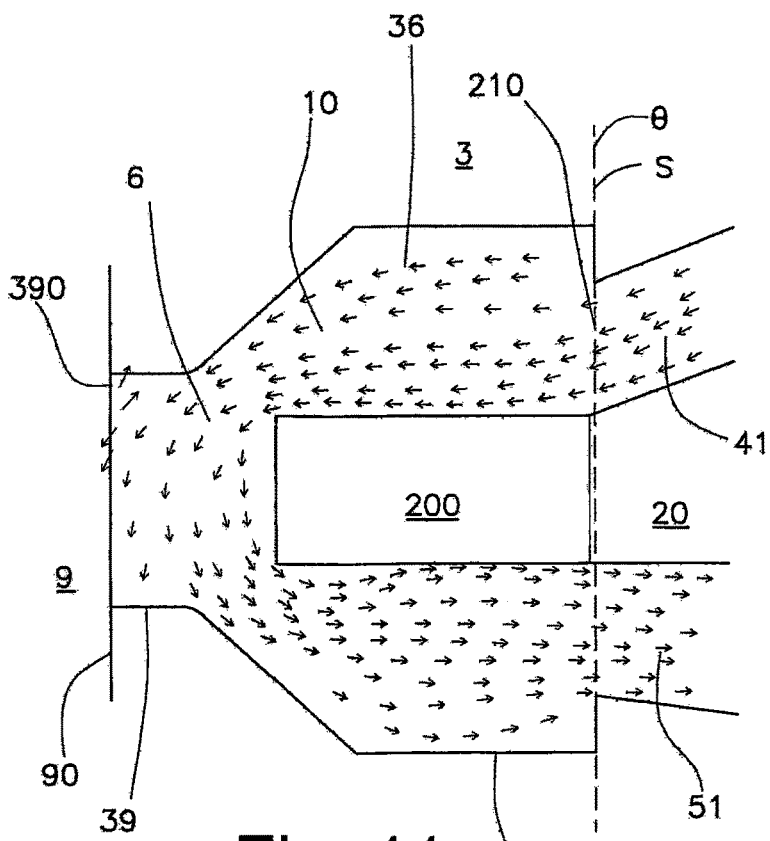
FIG. 11 shows a cutaway view along the radius XI-XI in FIG. 3 which shows in a complementary way the shape of the millimeter-size chamber for redox reactions with the presence of the partition wall along the smaller dimension thereof.
Figure 12:
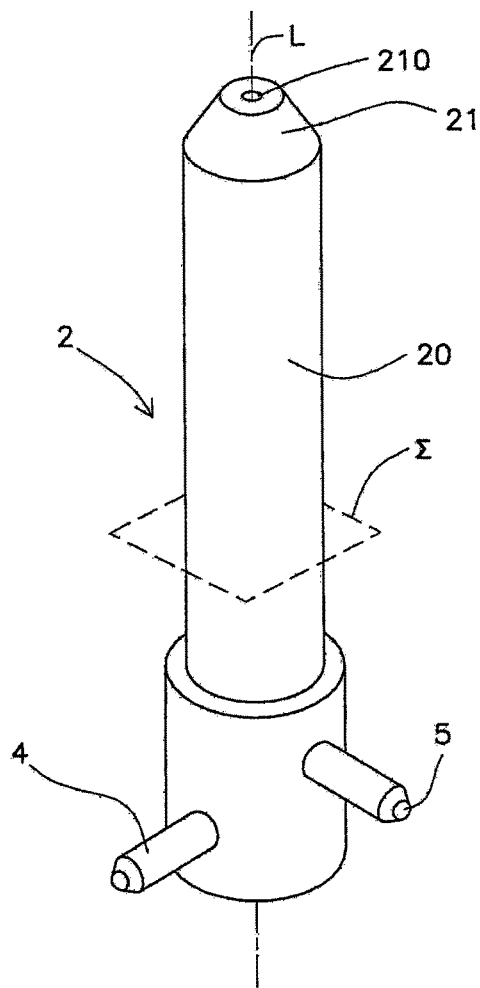
FIG. 12 shows a perspective view of an alternative miniaturized electrochemical cell according to the present invention.
Figure 13:
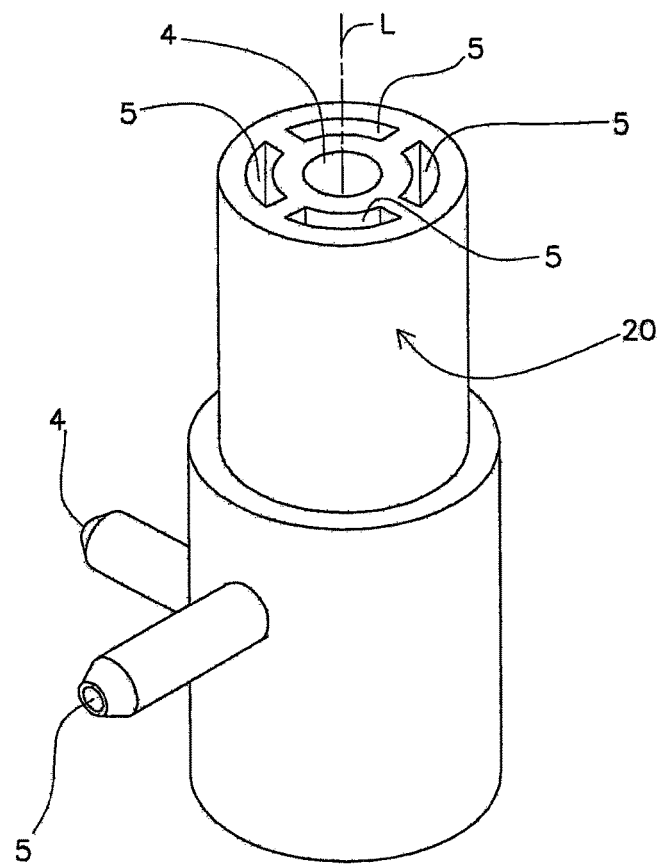
FIG. 13 shows a perspective view of a radial cut along a plane Σ in FIG. 12 which shows a radial section with a plurality of conduits for the electrolytic liquid solution.

As shown in FIG. 11 the side of shorter length of the partition wall 200 has much smaller dimensions than those of the inner cavity 36 and allows the electrolytic liquid solution 10 to pass from the inlet hollow conduit of millimeter-size diameter 41 to the outlet hollow conduit of millimeter-size diameter 51 at the radial dimension of the inner cavity 36 along the second radius S.

FIGS. 10 and 11 show geometric velocity vectors of portions of fluid of the electrolytic liquid solution 10. At the radial dimension along the first radius P the fluid is substantially static, whereas at the radial dimension along the second radius S, the fluid of the electrolytic liquid solution 10 flows from the inlet hollow conduit of millimeter-size diameter 41 to the outlet hollow conduit of millimeter-size diameter 51.

Figure 6:
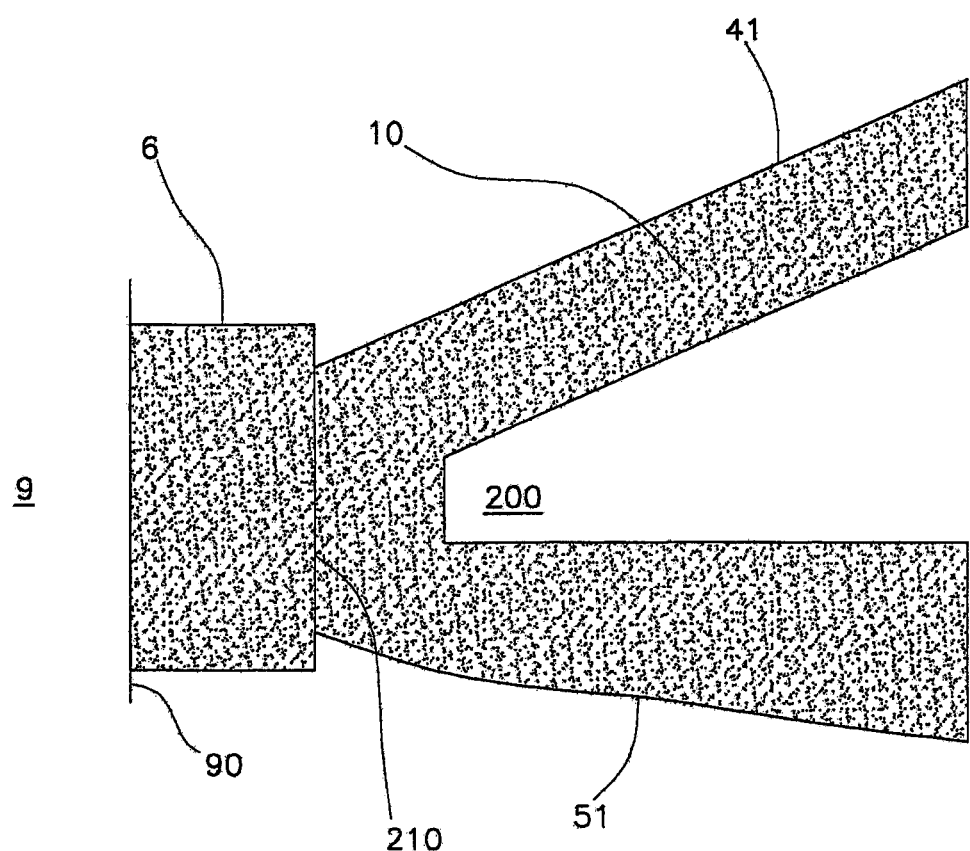
FIG. 6 shows an enlarged view A of the section in FIG. 5 highlighting in a complementary way a shape of an inlet conduit for an electrolytic liquid solution, a shape of a millimeter-size chamber for redox reactions, a shape of an outlet conduit for the electrolytic liquid solution.

As shown in FIG. 6, it is possible to provide for the inner cavity 36 of the sealing ring 3 to have a toroidal or cylindrical shape.

As shown in FIGS. 10 and 11, it is provided for said inner cavity 36 of the sealing ring 3 to comprise an end portion 39 facing toward the surface 90 of the conductor material to be analyzed 9. Said end portion 39 of the inner cavity 36 has dimensions which are shorter than the dimensions of the rest part of the inner cavity 36.

Said end portion 39 of the inner cavity 36 narrows gradually its dimensions toward the direction of the surface 90 of the conductor material to be analyzed 9.

Said end portion 39 of the sealing ring 3 has an outer border 390 adapted to contact the surface 90 of the conductor material to be analyzed 9.

The outer border 390 has at least one dimension comprised between 0.1 and 10 mm, wherein said dimension is the diameter of the outer border 390.

It should be noted that the sealing ring 3 is fitted into the millimeter-size opening 210 of the tip 21, whereby the dimensions of the outer border 390 are shorter than the dimensions of the millimeter-size opening 210. The circular border 390 of said through opening 360 has said at least one dimension which is shorter with respect to said at least one dimension of the millimeter-size opening 210 of the tip 21. The inner chamber 36 is concentric with the millimeter-size opening 210 of the main body 20.

Advantageously, the hydraulic seal of the device for localized electrochemical measurements 1 and the definition of the millimeter-size chamber for redox reactions 6 which defines the electrode is ensured by the sealing ring 3.

The sealing ring 3 is made of rubber or other plastic or non-conductor material. On one side said sealing ring 3 is mounted to adhere to the tip 21 of the main body 20 and on the other side it adheres to the surface 90 of the conductor material to be analyzed 9.

The main body 20 of the miniaturized electrochemical cell 2, the partition wall 200, the inlet hollow conduit 4 and the outlet hollow conduit 5 are made by means of 3D laser stereolithography using a photo-polymerizable resin. Other materials are also provided, such as for example ceramic-polymer composites, polymeric materials.

It may also be provided for the main body 20 to be made of metal and in this case it is possible to use it as a counter electrode 7. Advantageously, when the main body 20 is made of metal, it is possible to use electrolytic liquid solutions 10 which would otherwise be reactive with the polymeric composites, with the polymeric resins and other polymeric materials.

The main body 20 is made by means of 3D laser stereolithography. Said partition wall 200 is one piece with said main body 20. Said inlet hollow conduit 4 and said outlet hollow conduit 5 are hollowed out inside the main body 20. The main body 20 is made of a material selected in a list of materials adapted to be stereolithographed and which are not conductors at the temperatures of electrochemical measurement. Materials from which the main body 20 may be made are for example resin, photo-polymerizable resin, ceramic composites. The body of the cell may be made by 3D laser stereolithography of metals, for example steel and titanium, and in this case the body of the cell itself serves as counter electrode. Also in this case it is necessary to electrically isolate the working electrode from the counter electrode.

Advantageously, the 3D laser stereolithography allows to stereolithograph the inlet hollow conduit 4, the outlet hollow conduit 5 and the partition wall 200 so as to make them more efficient, solid, resistant and of a particular geometric shape as described above, with respect to the glass capillary conduits of the prior art.

In particular it is possible through the 3D laser stereolithography to give a shape to the partition wall 200 in order to have two different dimensions as described above and in FIGS. 3, 10 and 11.

The 3D laser stereolithography is a stereolithography method which uses liquid resin which is photocured through ultraviolet rays using 3D printing techniques. In the case of the metal 3D laser stereolithography, a laser beam melts the metal particles, according to a predetermined design, of a bed of metal particles forming the article by growth.

It is possible to provide for the main body 20 to be also made by other 3D printing processes, such as for example Selective Laser Sintering.

The tip 21 of the main body 20 comprises a millimeter-size opening 210 defined by the partition wall 200, by the radial cross sections of the inlet 41 and outlet 51 hollow conduits of millimeter-size diameter. Said millimeter-size opening 210 of the tip has at least one dimension comprised between 0.1 and 10 mm. Said dimension is the diameter of the millimeter-size opening 210 when the millimeter-size opening 210 has a circular shape. Better results are obtained when the diameter of the millimeter-size opening 210 is comprised between 0.2 and 6 mm. The millimeter-size opening 210 of the tip 21 does not have dimensions shorter than 0.1 mm since it would otherwise become a capillary opening with drawbacks already described in the prior art for capillary tubes. Beyond 10 mm the millimeter-size opening 210 would no longer be millimetric and the features of the miniaturization sought after in the present invention would be lost. Advantageously, the millimeter-size opening 210 allows to make electrochemical measurements on areas in the order of one square millimeter, for electrochemical corrosion tests, for thickness measurements according to the coulometry technique and for localized galvanic depositions, reduces the ohmic effects on the investigated area, reduces the effects due to the quick potential scanning in the potentiodynamic measurements, avoids effects of the dimension of the tip on the current limit value, avoids effects of concentration polarizations when voltage is measured, which allows to conduct electrochemical impedance measurements in a very simplified way.

Figure 16:
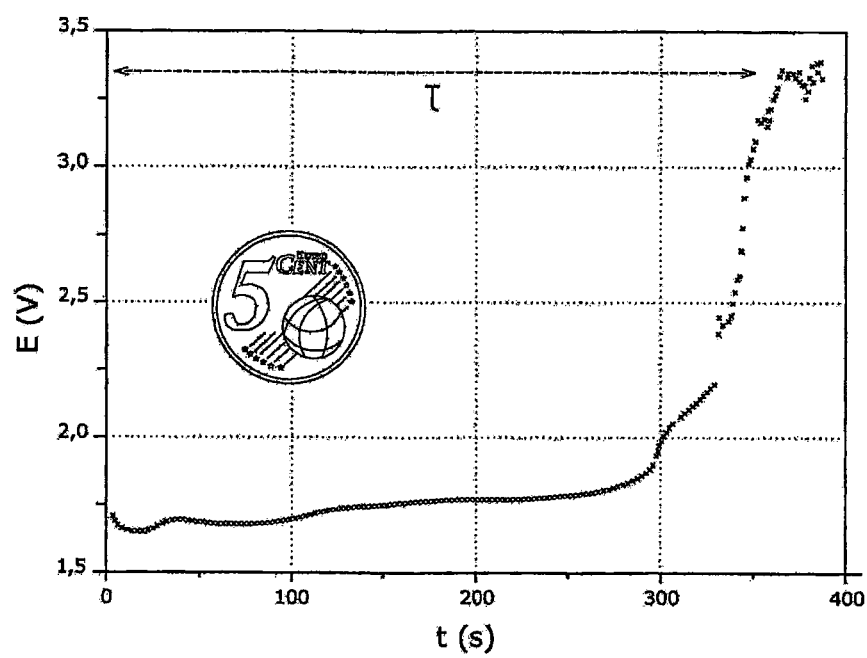
FIG. 16 shows a potential pattern of a coin's copper coating in the course of a thickness measurement by dissolution.

As regards the operation of the miniaturized electrochemical cell, a thickness measurement of a layer of copper (MMCu=63.5 g/mol; $\rho$=8.92 g/cm$^3$) on iron base of five Euro cents was carried out. Said layer of copper is the surface 90 of the conductor material to be analyzed 9. The results are shown in FIG. 16. The tip 21 of the miniaturized electrochemical cell 2 with the sealing ring 3 mounted was pressed against the surface 90 of the conductor material to be analyzed 9. An electrolytic liquid solution 10 was used comprising 80 g/l of potassium sodium tartrate (NaKC$_4$H$_4$O$_6$) and 100 g/l ammonium nitrate (NH$_4$NO$_3$). The electrochemical measurement took place at room temperature. The electrochemical liquid solution 10 withdrawn from a tank was circulated in the miniaturized electrochemical cell 2 by the peristaltic pump at a flow rate of Q=42 ml/min. The area of the working electrode is S=1.772 mm². The electrical current was I=3 mA, of the anode type for the copper coating (dissolution). The copper potential measured with respect to the reference electrode 8 was maintained stable for a certain time and underwent a variation which ended after a time period τ=370 s. Using Faraday's law $s_{Cu}=I\times\tau\times MM_{Cu}/(z\times F\times\rho\times S)$ a thickness of $s_{Cu}$=23.8 µm is obtained, in very good agreement with the value measured with another X-ray fluorescence method (23.9 µm).

Figure 17A:
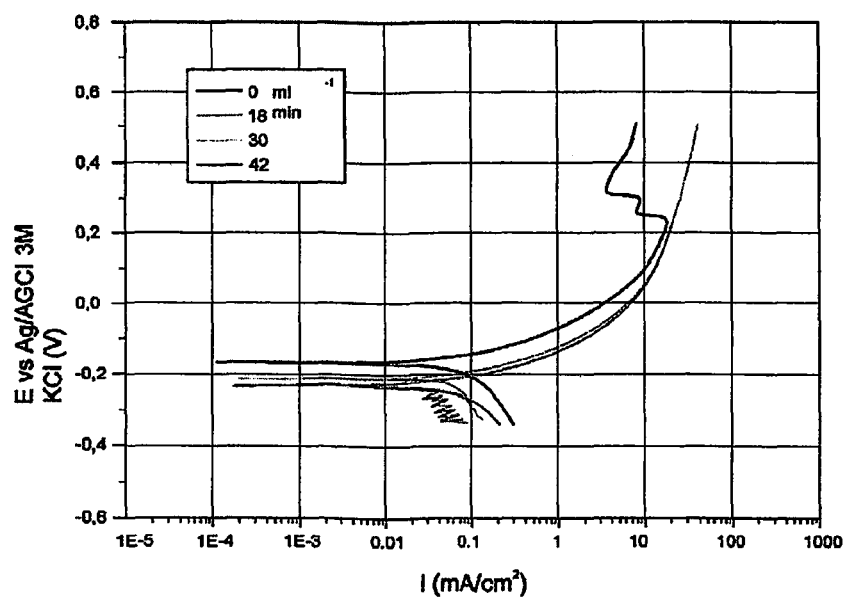
FIG. 17 shows potentiodynamic curves obtained from potentodynamic polarization measurements on a copper sample at 5 mV/s (A: NaCl 1M; B: $H_2SO_4$ 1M) obtained from potentiodynamic polarization measurements.
Figure 17B:
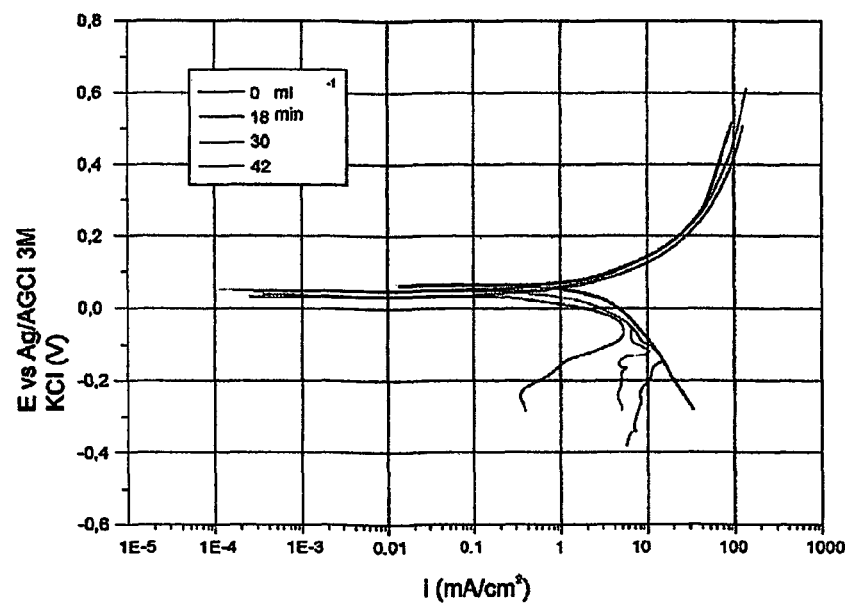

In another experiment to test the operation, potentiodynamic polarization measurements were carried out at room temperature on a copper sample. Scanning velocity v=5 mV/s in NaCl 1M and in $H_2SO_4$ 1M. The surface of the working electrode was S=1.722 mm². Measurements at different flow rates were carried out, Q=0, 18, 30 e 42 ml/min. The results are shown in FIG. 17.

Figure 18C:
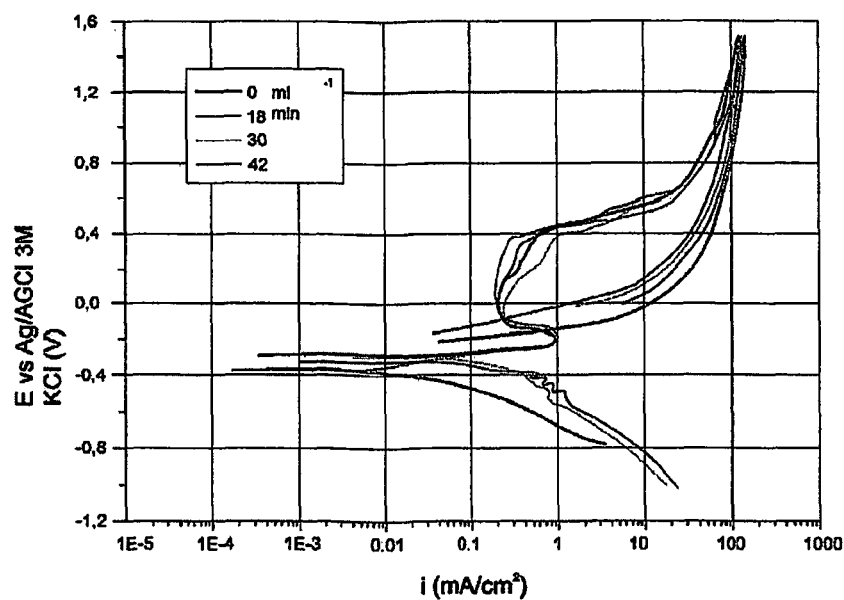
FIG. 18 shows potentiodynamic curves obtained from potentiodynamic polarization measurements on an AISI 316 sample at 10 mV/s (C: NaCl 1M; D: $H_2SO_4$ 1M).
Figure 18D:
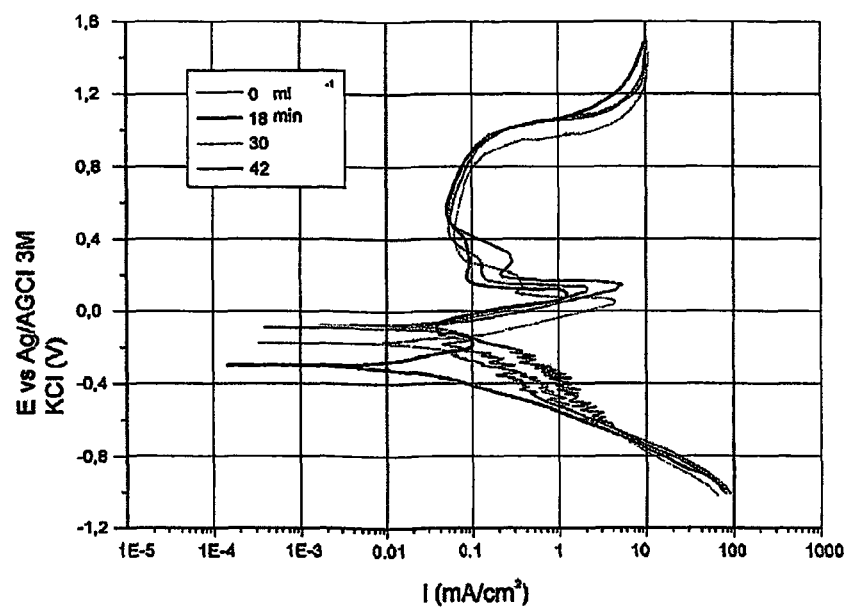

In a further experiment, potentiodynamic polarization measurements were carried out at room temperature on an AISI 316 sample of material 9. Scanning velocity v=10 mV/s in NaCl 1M and in $H_2SO_4$ 1M. The surface of the working electrode was S=1.722 mm². Measurements at different flow rates were carried out, Q=0, 18, 30 e 42 ml/min. The results are shown in FIG. 18.

Alternatively as shown in FIGS. 12-15, the configuration of the inlet 4 and outlet 5 hollow conduits of the miniaturized electrochemical cell 2 may also be of the coaxial type.

Figure 14:
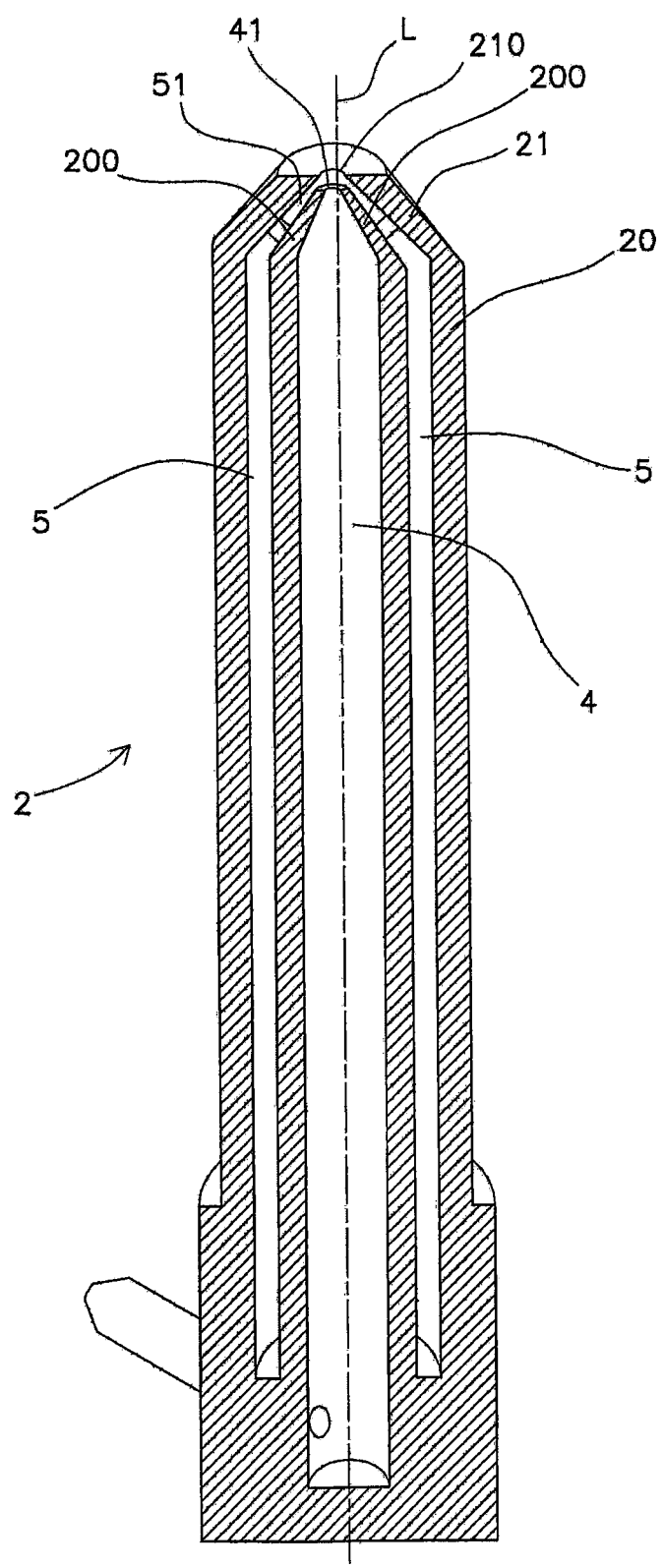
FIG. 14 shows a longitudinal section of the miniaturized electrochemical cell in FIG. 12.

In said alternative, as shown in particular in FIG. 14, the inlet hollow conduit 4 is hollowed out along the longitudinal axis L of the main body 20 of the miniaturized electrochemical cell 2.

Figure 15:
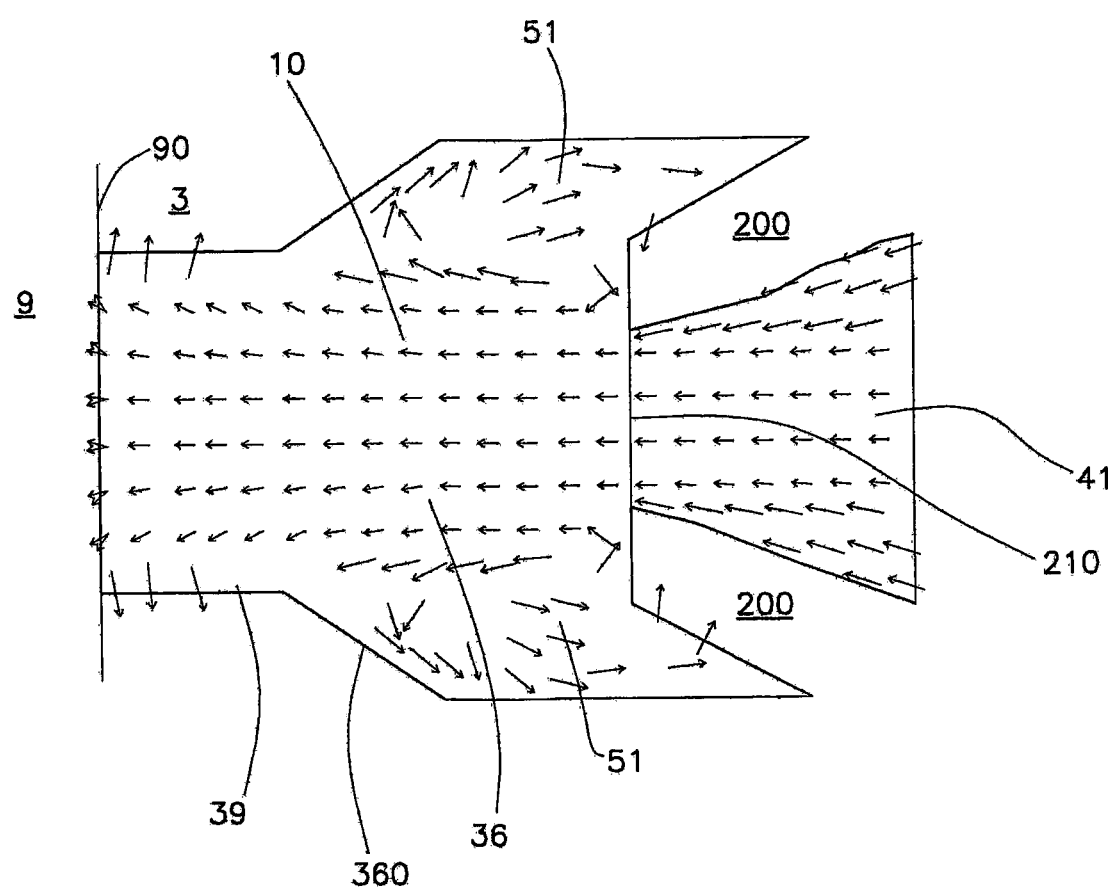
FIG. 15 shows a cutaway view which shows the shape of the millimetric chamber for redox reactions with two central partition walls which define a central inlet conduit for the electrolytic liquid solution and outer outlet conduits for the electrolytic liquid solution.

As shown in FIG. 15 the inlet hollow conduit 4 provides a capillary restriction with an inlet hollow conduit of millimeter-size diameter 41 in the region of the tip 21 of the miniaturized electrochemical cell 2.

As shown particularly in FIGS. 14 and 15, four outlet hollow conduits 5 arranged inside the main body 20 around the inlet hollow conduit 4 are provided.

As shown in FIG. 15, each outlet hollow conduit 5 provides a capillary restriction with a respective outlet hollow conduit of millimeter-size diameter 51 in the region of the tip 21 of the miniaturized electrochemical cell 2.

In said alternative, the partition wall 200 has concentric shape around the longitudinal axis L and separates the inlet hollow conduit 4 from the outlet hollow conduit 5.

Advantageously, the sealing ring 3 may also be applied to said alternative miniaturized electrochemical cell 2.

Alternatively, it is possible to provide a miniaturized electrochemical cell 2 comprising two or more inlet hollow conduits 4 and one or more outlet hollow conduits 5. For example, inlet hollow conduits 4 may be arranged around an outlet hollow conduit 5 which follows the longitudinal axis L.

The sealing ring 3 advantageously allows to avoid electrolytic liquid solution 10 leakages and advantageously avoids calibration problems dependent on the cell pressure exerted against the surface of the conductor material 9 to be analyzed, since the outer border 390 of the sealing ring 3 is solid and does not get deformed.

Alternatively, when the sealing ring 3 is not mounted, it is possible to provide for said at least one partition wall 200 of the main body 20 of the miniaturized electrochemical cell 2 to extend outwardly starting from the tip 21 of the main body 20, so that at least one portion of said at least one partition wall 200 enters inside the millimeter-size chamber for redox reactions 6. In said alternative, said at least one partition wall 200 is only one and is aligned with the longitudinal axis L. The partition wall 200 has a solid geometric shape with the side of longer length aligned with the first radius F of the geometric cross section of the main body 20 and with the side of shorter length aligned with the second radius S of the geometric cross section of the main body 20. Said first radius F is perpendicular to the second radius S. Said cross section lies geometrically on the geometric plane Θ which is perpendicular to the longitudinal axis L. The side of longer length of the partition wall 200 has similar dimensions with respect to the millimeter-size chamber for redox reactions 6 in order to block or restrict strongly the flow of the electrolytic liquid solution 10 at the radial dimension of the millimeter-size chamber for redox reactions 6 along the first radius F. The side of shorter length of the partition wall 200 has shorter dimensions than that of the millimeter-size chamber for redox reactions 6 in order to allow the electrolytic liquid solution 10 to pass from the inlet hollow conduit of millimeter-size diameter 41 to the outlet hollow conduit of millimeter-size diameter 51 at the radial dimension of the millimeter-size chamber for redox reactions 6 along the second radius S.

Alternatively, it is possible to provide for the tip 21 to be made of hydrophobic material, such as for example Teflon and may operate without the sealing ring 3. The hydrophobic material of the tip 21 is adapted to maintain the liquid inside the millimeter-size chamber for redox reactions 6.

Alternatively, the main body 20 of the miniaturized electrochemical cell 2 has a toroidal shape with the axis of the central opening that is aligned with the longitudinal axis L.

Advantageously, the device for localized electrochemical measurements 1 allows to make electrochemical measurements on areas in the order of one square millimeter, for electrochemical corrosion tests, for thickness measurements according to the coulometry technique and for localized galvanic depositions. It is much more solid, simplified and easy to make since there are no glass capillaries, moreover the structure of the main body 20, of the partition wall 200 and of the inlet 4 and outlet 5 conduits is much more solid and resistant. The inlet conduits of millimeter-size diameter 41 and 51 are advantageously much more solid with respect to capillary conduits. The ohmic effects on the investigated area are advantageously reduced. Effects due to the quick potential scanning in the potentiodynamic measurements are advantageously reduced. Solution leakages are avoided. The locking of the tip 21 is avoided. Effects of the dimension of the tip 21 on the current limit value are advantageously avoided. Effects of concentration polarizations when voltage is measured are advantageously avoided. The device 1 advantageously allows to conduct electrochemical impedance measurements in a very simplified way. Calibration problems dependent on the cell pressure exerted against the material to be analyzed are advantageously avoided.

Advantageously, the device for localized electrochemical measurements 1 allows to maintain the flow rates of the electrolytic liquid solution 10 in the millimeter-size chamber for redox reactions 6 inside the inner cavity 36 of the sealing ring 3 with flow velocity comprised between 1 ml/min and 200 ml/min. Preferably, flow velocities of the electrolytic liquid solution 10 comprised between 10 ml/min and 50 ml/min are obtained.

The invention claimed is:

1. A miniaturized electrochemical cell comprising a main body comprising a tip adapted to allow electrochemical measurements of a surface of a conductor material to be analyzed which serves as working electrode, said main body comprising at least one inlet hollow conduit for an electrolytic liquid solution and at least one outlet hollow conduit for said electrolytic liquid solution, said electrolytic liquid solution flowing from said at least one inlet hollow conduit to said at least one outlet hollow conduit, the miniaturized electrochemical cell comprising a counter electrode, said miniaturized electrochemical cell mounting a reference electrode, at a region of the tip each of said at least one inlet hollow conduit narrows into at least one inlet hollow conduit of millimeter-size diameter and each of said at least one outlet hollow conduit narrows into at least one outlet hollow conduit of millimeter-size diameter, at a space between the tip and the surface of the conductor material to be analyzed—it is identified a millimeter-size chamber for redox reactions which communicates with said least one inlet hollow conduit of millimeter-site diameter and with said at least one outlet hollow conduit of millimeter-size diameter, said at least one inlet hollow conduit of millimeter-size diameter being separated from said at least one outlet hollow conduit of millimeter-size diameter by at least one partition wall, wherein:

said at least one partition wall is one piece with said main body, said at least one inlet hollow conduit and said at least one outlet hollow conduit are hollowed out inside the main body, the tip of the main body comprises a millimeter-size opening of millimetric dimension which communicates with said millimeter-size chamber for redox reactions; wherein said millimeter-size opening is defined by said at least one partition wall, by said at least one inlet hollow conduit of millimeter-size diameter and by said at least one outlet hollow conduit of millimeter-size diameter.

2. The miniaturized electrochemical cell according to the claim 1, wherein said millimeter-size opening of the tip has at least one dimension comprising between 0.2 and 6 mm.

3. The miniaturized electrochemical cell according to claim 1, wherein said at least one partition wall of the main body of the miniaturized electrochemical cell extends outwardly starting from the tip of the main body, so that at least one portion of said at least one partition wall enters inside the millimeter-size chamber for redox reactions.

4. The miniaturized electrochemical cell according to the claim 3, wherein said at least one partition wall is only one and is aligned with a longitudinal axis, the partition wall has a solid geometric shape with a side of longer length aligned with a first radius of a geometric cross section of the main body and with a side of shorter length aligned with a second radius of the geometric cross section of the main body, said first radius is perpendicular to the second radius, said cross section lies geometrically on a geometric plane which is perpendicular to the longitudinal axis, the side of longer length of the partition wall has similar dimensions with respect to that of the millimeter-size chamber for redox reactions in order to block or to restrict strongly the flow of the electrolytic liquid solution at the radial dimension of the millimeter-size chamber for redox reactions aligned along the first radius, the side of shorter length of the partition wall is of shorter dimensions than that of the millimeter-size chamber for redox reactions in order to allow the electrolytic liquid solution to flow from the inlet hollow conduit of millimeter-size diameter to the outlet hollow conduit of millimeter-size diameter at the radial dimension of the millimeter-size chamber for redox reactions aligned along the second radius.

5. The miniaturized electrochemical cell according to claim 1, wherein the main body is realized by means of stereolithography or by 3D printing techniques.

6. The combination of a sealing ring and a miniaturized electrochemical cell as defined in claim 1, said sealing ring being mounted on the tip of the main body of the miniaturized electrochemical cell, said sealing ring comprising a through opening which has a cross section of circular shape defining a circular border of the through opening which is in contact with the surface of the conductor material to be analyzed, said through opening being coaxial to the millimeter-size opening of the tip of the main body of the miniaturized electrochemical cell, said through opening comprising an inner cavity adapted to surround the millimeter-size chamber for redox reactions, wherein said circular border of the through opening has millimetric dimensions.

7. The combination according to the claim 6, wherein said circular border of said through opening has a diameter comprising between 0.2 and 6 mm and shorter than at least one dimension of the millimeter-size opening of the tip.

8. The combination according to claim 6, wherein said inner cavity is of toroidal shape or cylindrical shape.

9. The combination according to claim 6, wherein said inner cavity of the sealing ring comprises an end portion facing toward the surface of the conductor material to be analyzed, said end portion of the inner cavity has dimensions which are shorter than the dimensions of the rest part of the inner cavity.

10. The combination according to the claim 9, wherein said end portion of the inner cavity narrows gradually its dimensions toward the direction of the surface of the conductor material to be analyzed.

11. The combination according to the claim 6, wherein said inner cavity of said through opening of the sealing ring is adapted to contain at least one portion of said at least one partition wall extending from the tip of the main body of the miniaturized electrochemical cell toward the inside of the inner cavity of the sealing ring.

12. A device for localized electrochemical measurements, comprising a combination of a sealing ring and a miniaturized electrochemical cell according to claim 6.

13. The device for localized electrochemical measurements according to the claim 12, wherein the main body of the miniaturized electrochemical cell is of a material comprised in a list consisting of a polymeric material, a photopolymerizable resin, a ceramic polymer composite, or a metal.

* * * * *